(12) United States Patent
Gandhasri et al.

(10) Patent No.: US 11,544,387 B2
(45) Date of Patent: Jan. 3, 2023

(54) HASH PROTECTION WITHIN AN OBJECT STORAGE LIBRARY

(71) Applicant: International Business Machines Corporation, Armonk, NY (US)

(72) Inventors: Rajamohan Gandhasri, San Jose, CA (US); Steven R. Hetzler, Los Altos, CA (US); Robert M. Rees, Los Gatos, CA (US); Wayne C. Hineman, San Jose, CA (US); John S. Best, San Jose, CA (US); Zhenxing Han, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/249,811

(22) Filed: Jan. 16, 2019

(65) Prior Publication Data

US 2020/0226269 A1 Jul. 16, 2020

(51) Int. Cl.
*H04L 29/06* (2006.01)
*G06F 21/60* (2013.01)
*H04L 9/06* (2006.01)

(52) U.S. Cl.
CPC .......... *G06F 21/602* (2013.01); *H04L 9/0643* (2013.01)

(58) Field of Classification Search
CPC ... H04W 4/00; H04W 9/0643; H04W 9/0894; G06F 16/00; G06F 21/645; G06F 21/602; H04L 63/00
See application file for complete search history.

(56) References Cited

U.S. PATENT DOCUMENTS

| 8,121,993 | B2 | 2/2012 | Blount et al. |
| 8,836,548 | B1 * | 9/2014 | Chandra ............... H03M 7/607 341/60 |
| 8,938,469 | B1 * | 1/2015 | Keen ................... H04L 45/7453 707/769 |
| 10,025,518 | B1 * | 7/2018 | Totappanavar ....... G06F 3/0631 |
| 10,635,644 | B2 * | 4/2020 | Theimer ............. G06F 11/3055 |
| 2011/0007893 | A1 | 1/2011 | Sunar et al. |

(Continued)

FOREIGN PATENT DOCUMENTS

| CN | 104541251 A * 4/2015 .......... H03M 13/251 |
| CN | 105183400 A 12/2015 |

(Continued)

OTHER PUBLICATIONS

Liu et al., "DMS: a Dynamic Multi-tiered Storage with Deduplication Based on Variable-Sized Chunks," 6th International Conference on Computer Science and Network Technology, 2017, pp. 127-131.

(Continued)

*Primary Examiner* — Joseph P Hirl
*Assistant Examiner* — Leynna Truvan
(74) *Attorney, Agent, or Firm* — Zilka-Kotab, P.C.

(57) ABSTRACT

According to one embodiment, a computer-implemented method includes receiving an object to be stored within a storage library, computing a hash value, utilizing the object, determining a storage location within the storage library to store the hash value, and sending the hash value to the storage location and neighbor locations of the storage location within the storage library.

14 Claims, 7 Drawing Sheets

(56) References Cited

U.S. PATENT DOCUMENTS

| | | | |
|---|---|---|---|
| 2015/0234854 A1 | 8/2015 | Yakushev et al. | |
| 2016/0210044 A1* | 7/2016 | Mitkar | G06F 3/0656 |
| 2017/0255676 A1* | 9/2017 | Attaluri | G06F 16/2255 |
| 2017/0373856 A1 | 12/2017 | Kriz | |
| 2019/0042144 A1* | 2/2019 | Peterson | G06F 3/067 |

FOREIGN PATENT DOCUMENTS

| | | | | |
|---|---|---|---|---|
| CN | 106033519 A | | 10/2016 | |
| CN | 108334458 A | * | 7/2018 | G06F 12/084 |
| JP | 6450756 B2 | * | 1/2019 | G06F 11/3006 |

OTHER PUBLICATIONS

Rahumed et al., "A Secure Cloud Backup System with Assured Deletion and Version Control," International Conference on Parallel Processing Workshops, 2011, pp. 160-167.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.

* cited by examiner

HASH PROTECTION WITHIN AN OBJECT STORAGE LIBRARY

BACKGROUND

The present invention relates to object storage, and more specifically, this invention relates to storing hash data in a protected manner within an object storage library.

Cloud-based storage libraries are a popular way to implement object storage within a computing environment. Within these storage libraries, stored object data is protected utilizing erasure coding. However, hashes/fingerprints used to perform deduplication within these storage libraries are not protected against component errors or failure.

SUMMARY

According to one embodiment, a computer-implemented method includes receiving an object to be stored within a storage library, computing a hash value, utilizing the object, determining a storage location within the storage library to store the hash value, and sending the hash value to the storage location and neighbor locations of the storage location within the storage library.

According to another embodiment, a computer program product for implementing hash protection within an object storage library includes a computer readable storage medium having program instructions embodied therewith, where the computer readable storage medium is not a transitory signal per se, and where the program instructions are executable by a processor to cause the processor to perform a method including receiving, by the processor, an object to be stored within a storage library, computing, by the processor, a hash value, utilizing the object, determining, by the processor, a storage location within the storage library to store the hash value, and sending, by the processor, the hash value to the storage location and neighbor locations of the storage location within the storage library.

According to another embodiment, a system includes a processor, and logic integrated with the processor, executable by the processor, or integrated with and executable by the processor, where the logic is configured to receive an object to be stored within a storage library, compute a hash value, utilizing the object, determine a storage location within the storage library to store the hash value, and send the hash value to the storage location and neighbor locations of the storage location within the storage library.

Other aspects and embodiments of the present invention will become apparent from the following detailed description, which, when taken in conjunction with the drawings, illustrate by way of example the principles of the invention.

DETAILED DESCRIPTION

Figure 1:
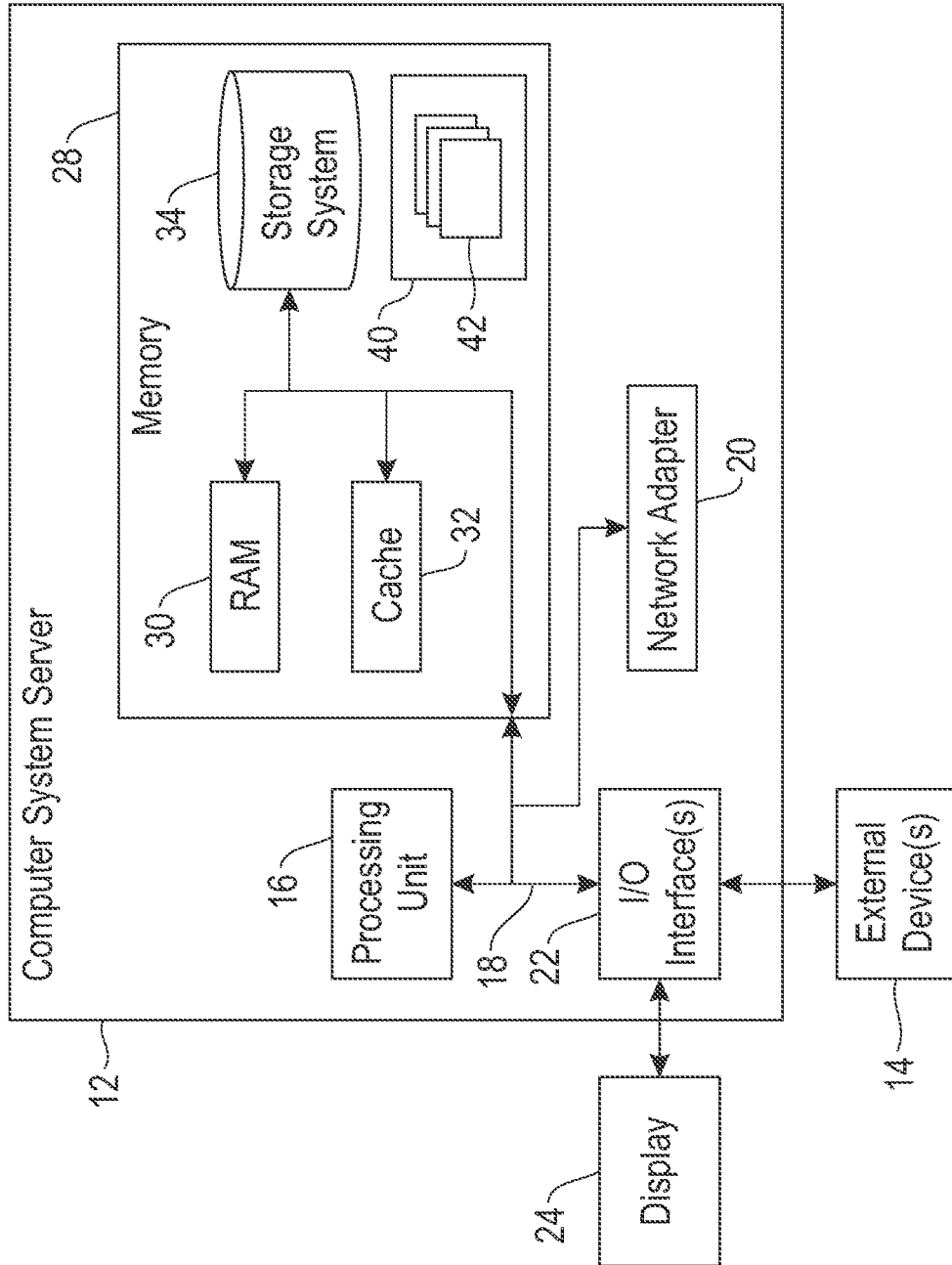
FIG. 1 depicts a cloud computing node according to an embodiment of the present invention.

The following description discloses several preferred embodiments of systems, methods and computer program products for implementing hash protection within an object storage library. Various embodiments provide a method for computing a hash value for an object, and determining a storage location for the hash value, based on the hash value itself.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing hash protection within an object storage library.

In one general embodiment, a computer-implemented method includes receiving an object to be stored within a storage library, computing a hash value, utilizing the object, determining a storage location within the storage library to store the hash value, and sending the hash value to the storage location and neighbor locations of the storage location within the storage library.

In another general embodiment, a computer program product for implementing hash protection within an object storage library includes a computer readable storage medium having program instructions embodied therewith, where the computer readable storage medium is not a transitory signal per se, and where the program instructions are executable by a processor to cause the processor to perform a method including receiving, by the processor, an object to be stored within a storage library, computing, by the processor, a hash value, utilizing the object, determining, by the processor, a storage location within the storage library to store the hash value, and sending, by the processor, the hash value to the storage location and neighbor locations of the storage location within the storage library.

In another general embodiment, a system includes a processor, and logic integrated with the processor, executable by the processor, or integrated with and executable by the processor, where the logic is configured to receive an object to be stored within a storage library, compute a hash value, utilizing the object, determine a storage location within the storage library to store the hash value, and send the hash value to the storage location and neighbor locations of the storage location within the storage library.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
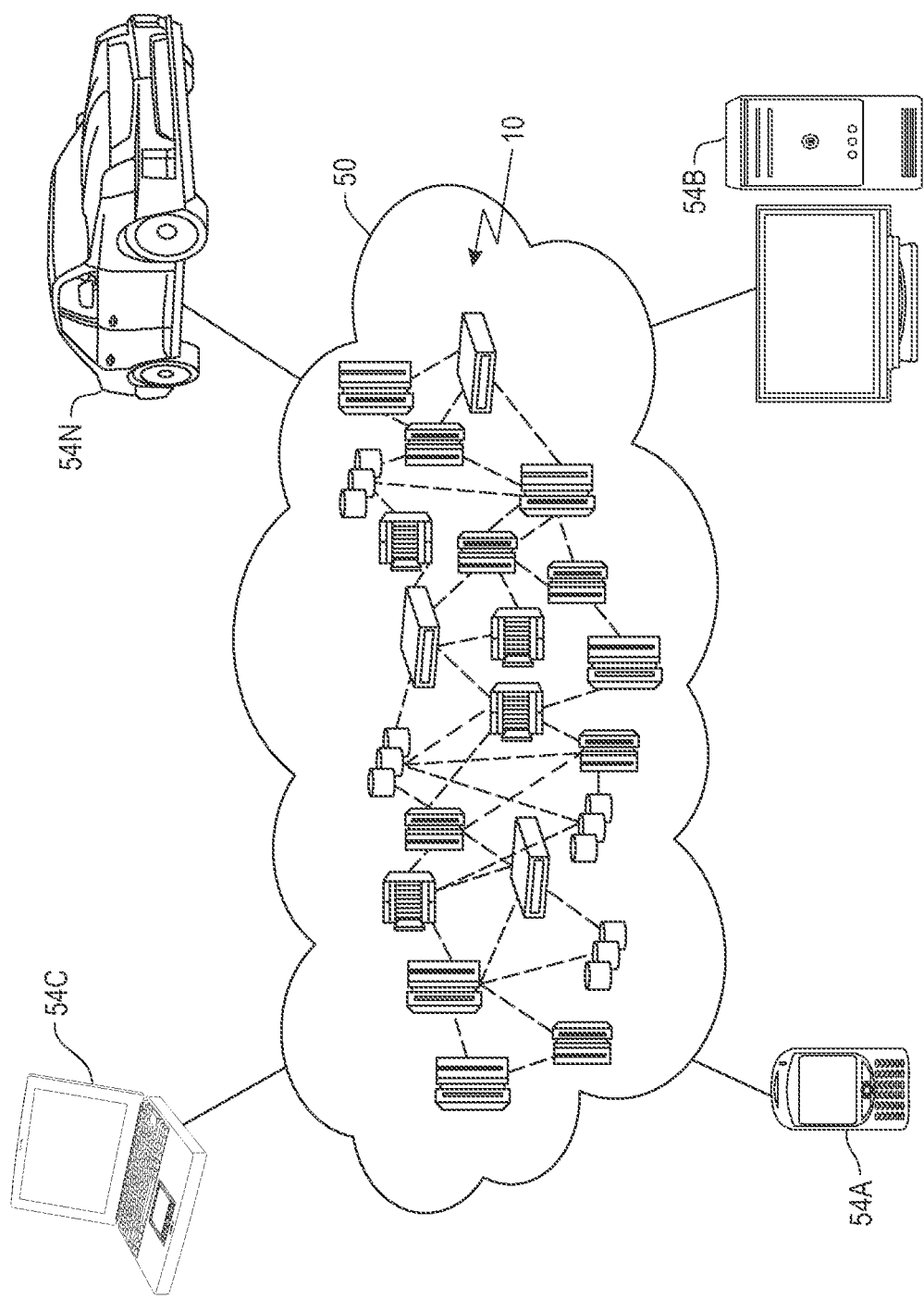
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
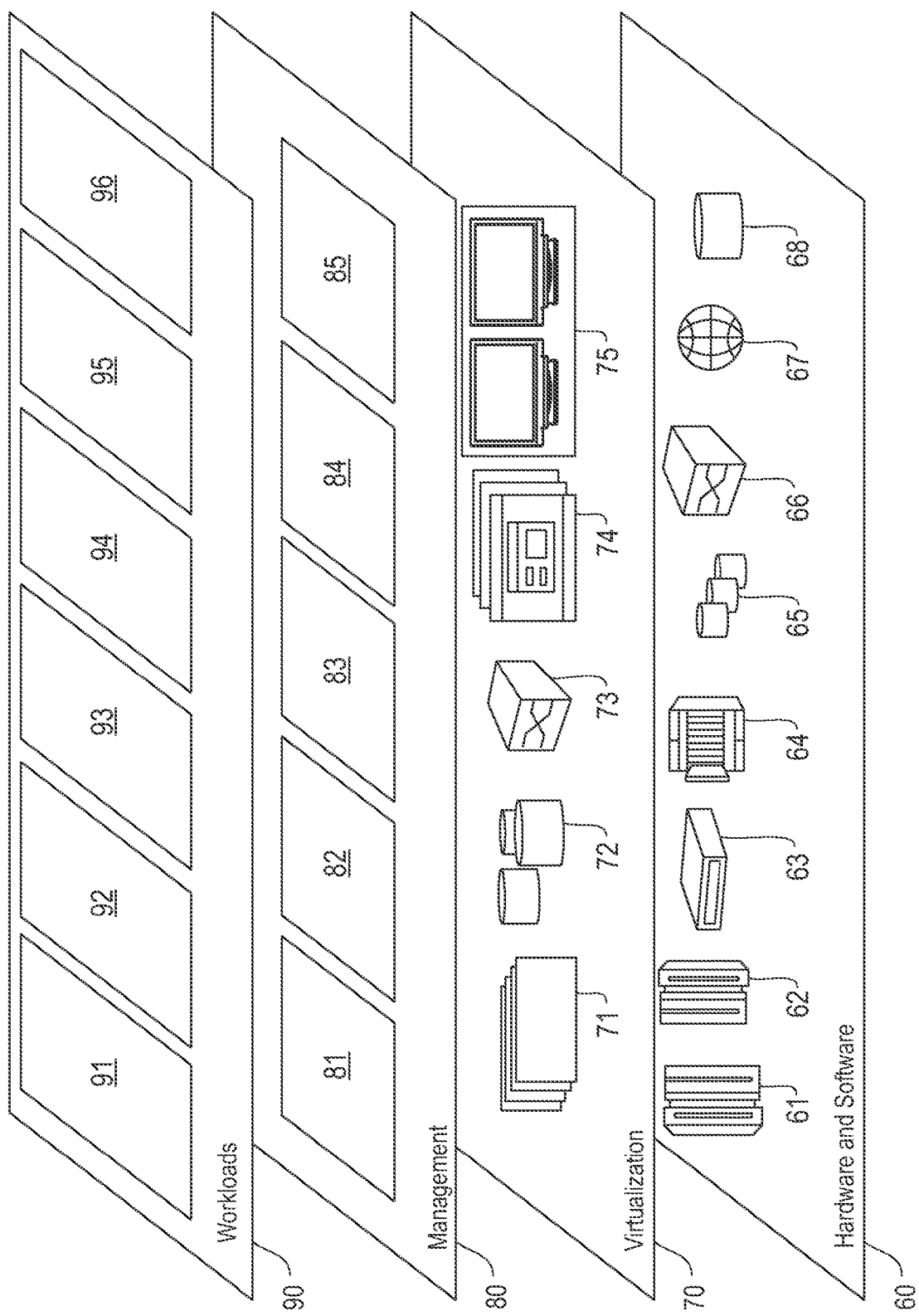
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and systemic adaptive data management 96.

Figure 4:
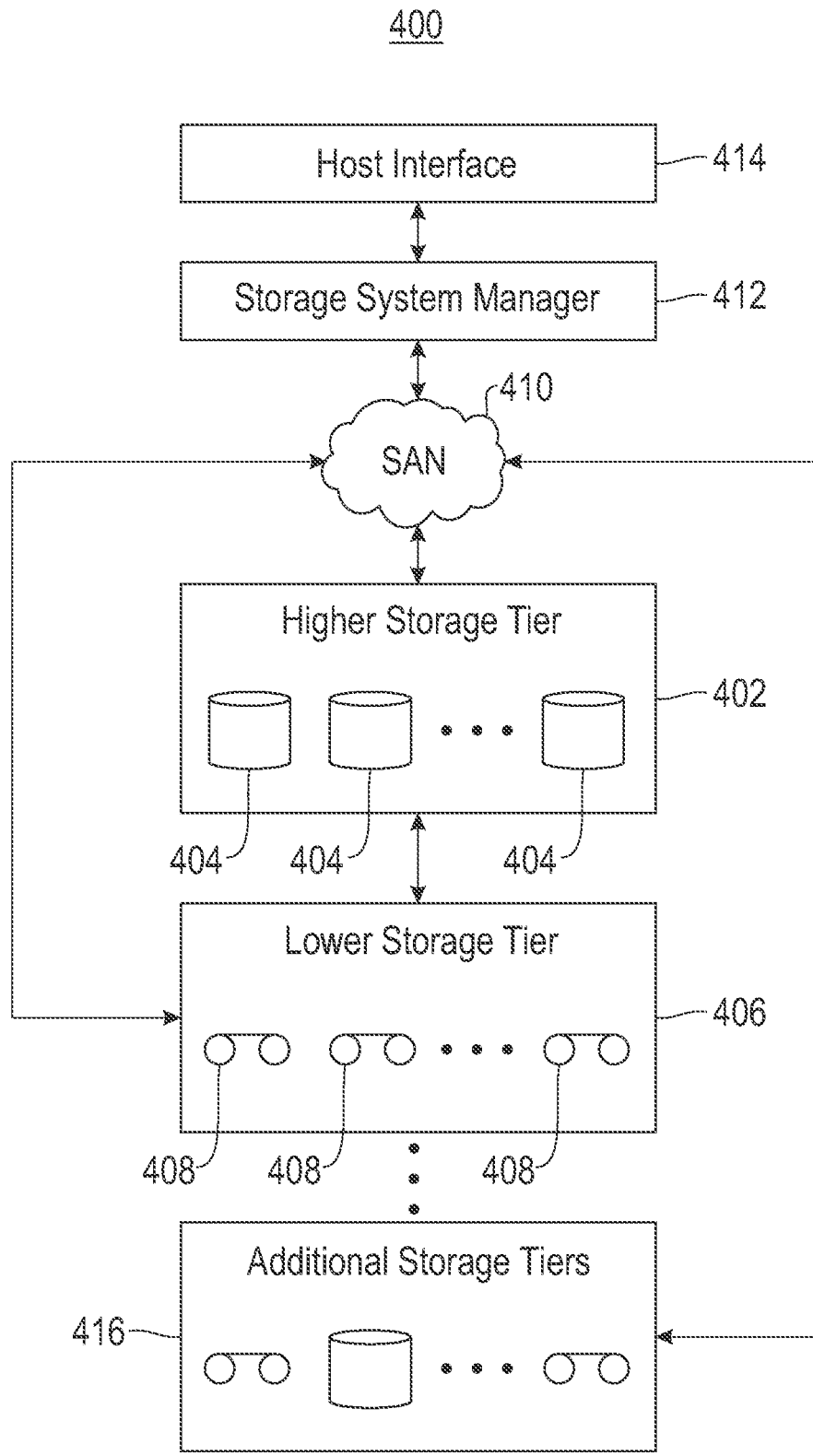
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
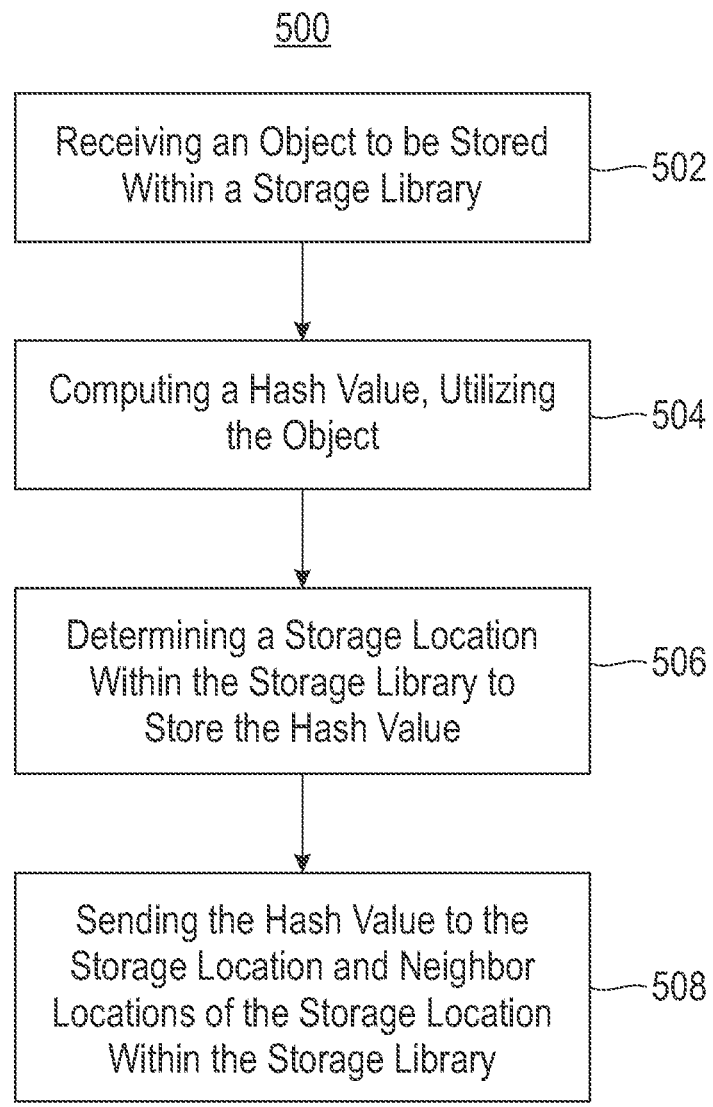
FIG. 5 illustrates a flowchart of a method for implementing hash protection within an object storage library, in accordance with one embodiment.

Now referring to FIG. 5, a flowchart of a method 500 is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an object to be stored within a storage library is received. In one embodiment, the object may include one or more of an image, a document, a video, audio, etc. In another embodiment, the object may be received from an application, a computing device (e.g., an end user device, a server, etc.). In yet another embodiment, the storage library may include an object storage library.

Additionally, in one embodiment, the storage library may be cloud-based. For example, the storage library may be implemented within a cloud computing environment. In another embodiment, the object may be received at the storage library. For example, the storage library may include a virtual controller. In another example, the storage library may include a plurality of storage units (e.g., object storage units, etc.). For instance, the virtual controller may receive the object to be stored. In another example, each of the plurality of storage units may include optical storage (e.g., one or more optical media drives, one or more optical media disks, etc.).

Further, in one embodiment, the object may be added to a buffer within the storage library (e.g., a write buffer within the virtual controller, etc.). For example, the buffer may include a redundant array of independent disks (RAID) (e.g., a plurality of disks in a RAID-6 configuration, etc.).

Further still, method 500 may proceed with operation 504, where a hash value is computed, utilizing the object. In one embodiment, the hash value may include a fingerprint value for the object. In another embodiment, the hash value may be computed by applying one or more cryptographic hash functions to the object. For example, the one or more cryptographic hash functions may include one or more SHA-2 hash functions (e.g., an SHA-256 hash function, etc.). In another example, the hash value may include the value resulting from applying the one or more cryptographic hash functions to the object.

Also, in one embodiment, the hash value may be calculated by the virtual controller of the storage library. In another embodiment, the hash value may be compared against a plurality of additional hash values stored within the storage library. For example, the additional hash values may be stored within a fingerprint database of one or more storage units within the storage library.

In addition, in one embodiment, if the hash value matches one of the existing hash values, the object may be discarded. For example, a name associated with the discarded object may be compared to one or more object names associated with the matching hash value. In another example, the one or more object names may be stored in a database (e.g., an object database) in association with the matching hash value. In yet another example, if the name associated with the discarded object does not match one of the one or more object names associated with the matching hash value, the name associated with the discarded object may be added to the one or more object names associated with the matching hash value (e.g., within the object database, etc.).

Furthermore, in one embodiment, if the name associated with the discarded object matches one or more names associated with the matching hash value, the name associated with the discarded object may be discarded as well. In another embodiment, if the hash value does not match any of the existing hash values, the object may be sent to a storage unit of the storage library for storage. For example, the object may be stored at the storage unit of the storage library. In another example, the object may be stored within the storage library utilizing erasure coding. For instance, one or more redundant portions of the object may be created and stored at multiple storage units within the storage library.

Further still, in one embodiment, a name of the object may be stored in association with the hash value (e.g., within the object database, etc.). In another embodiment, if the hash value does not match any of the existing hash values, the hash value may be added to the plurality of additional hash values stored within the storage library. For example, the hash value may be added to the fingerprint database of the storage units. In another embodiment, metadata may be added to the hash value indicating the storage unit of the storage library where the object is stored, a location of the object within a predetermined optical media disk of the storage unit, etc.

In this way, one or more deduplication actions may be performed, utilizing the computed hash value and the additional stored hash values.

Also, method 500 may proceed with operation 506, where a storage location within the storage library is determined to store the hash value. In one embodiment, the storage location may be determined in response to determining that the hash value does not match one or more of the plurality of additional hash values stored within the storage library. In another embodiment, the storage location may be determined utilizing the hash value. For example, the storage location may be determined by performing a modulo operation between a most significant byte of the hash value and a total number of storage units within the storage library. For instance, the storage location may be determined by computing: (most significant byte of the hash value) MOD (total number of storage units within the storage library).

Additionally, in one embodiment, the storage location may indicate a location of a predetermined storage unit of the storage library. For example, each of a plurality of storage units may be numbered sequentially within the storage library (e.g., using integer value assignments starting with one, etc.). In another example, the integer value assigned to a storage unit may indicate the storage location of the storage unit. In yet another example, the storage location determined utilizing the hash value may include an integer value, and the storage unit having the matching storage location may be selected to receive the hash value.

Further, in one embodiment, the storage location within the storage library determined to store the hash value may be different from the storage location within the storage library determined to store the object.

Further still, method 500 may proceed with operation 508, where the hash value is sent to the storage location and neighbor locations of the storage location within the storage library. In one embodiment, the hash value may be sent to the storage unit of the storage library that has the determined storage location. In another embodiment, the hash value may be sent to neighboring storage units to the predetermined storage unit. For example, the storage location may be incremented by a value of one to determine a first neighbor storage location. In another example, the storage location may be decremented by a value of one to determine a second neighbor storage location.

Also, in one embodiment, if the determined storage unit location is the first assigned storage location, then the last assigned storage location may be identified as a neighbor location of the storage location. In another embodiment, if the determined storage unit location is the last assigned storage location, then the first assigned storage location may be identified as a neighbor location of the storage location. In yet another embodiment, the hash value may also be sent to the storage units of the storage library at the first neighbor storage location and the second neighbor storage location.

In addition, in one embodiment, a location of the object may be stored in association with the hash value. For example, a location of the object (e.g., at a storage unit within the storage library, within a predetermined optical media disk, etc.) may be stored as metadata with the hash value. In another embodiment, if one or more of the storage location and the neighbor locations of the storage location are currently unavailable, the hash value may be temporarily stored in a fingerprint database of the virtual controller, until the currently unavailable storage location becomes available. At that time, the hash value may be removed from the fingerprint database and sent to the storage location.

Furthermore, in one embodiment, hash values received at a storage unit may be stored within a first drive of the storage unit. For example, the first drive may include a solid state drive (SSD) of the storage unit. In another example, the hash values may be stored within a fingerprint database stored at the first drive. In yet another example, the hash values may be stored as part of an erasure code group. For instance, hash values may be stored at various erasure code groups within the storage units in order to provide recovery support for a centralized database (e.g., the fingerprint database within the virtual controller, etc.).

Further still, in one embodiment, objects received at a storage unit may be stored within optical storage of the storage unit that is separate from the first drive. For example, the objects may be written to one or more optical media disks, utilizing one or more optical media drives. In another embodiment, hash values stored within one or more of the storage units may be sent to the virtual controller in response to a failure of the fingerprint database within the virtual controller. For example, if the virtual controller fails (e.g., via a hardware, software, and/or network failure, etc.), the hash values stored within erasure code groups of one or more of the storage units may be sent to the recovered virtual controller in order to restore hash values stored within the fingerprint database of the recovered virtual controller.

In this way, hashes may be protected against storage unit failure by distributing copies of the hash to multiple different storage units within the storage library. In the event of a failure of a storage unit, multiple additional storage units may maintain the hashes stored within the failed storage unit. This may improve the data integrity and data security of data stored within the storage library, and may improve a performance of the storage library in the event of one or more storage unit failures.

Figure 6:
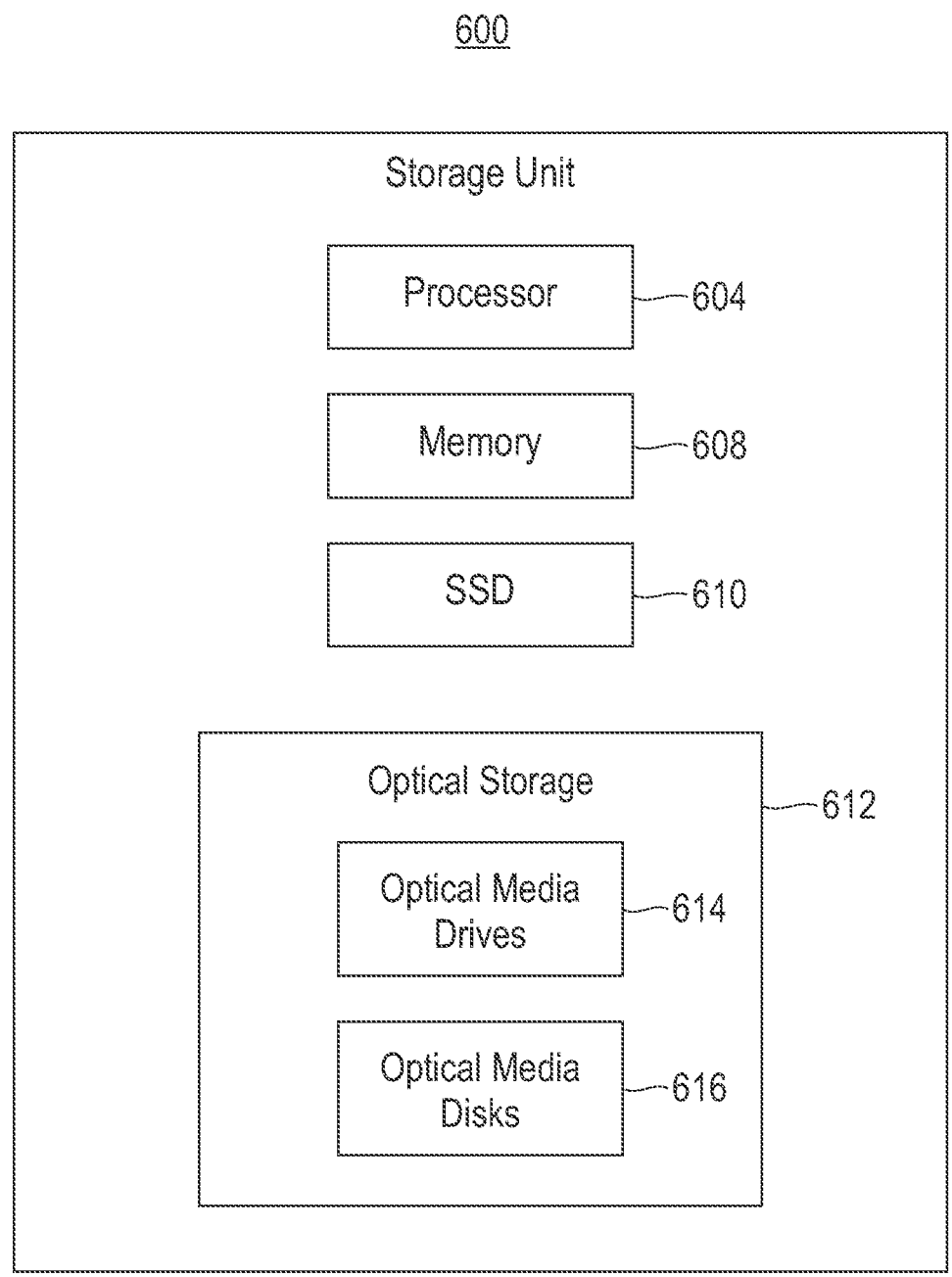
FIG. 6 illustrates an exemplary storage unit, in accordance with one embodiment.

FIG. 6 illustrates an exemplary storage unit 600, according to one exemplary embodiment. As shown, the storage unit 600 includes a hardware processor 604, memory 608, and a solid state storage 610 (e.g., an SSD, etc.). Additionally, the storage unit includes optical storage 612. This optical storage 612 includes a plurality of optical media drives 614. Each of these optical media drives 614 may include a high-capacity optical drive such as a Blu-ray drive.

Additionally, the optical storage 612 includes a plurality of optical media disks 616. Each of these optical media disks 616 may include a high-capacity optical disk such as a Blu-ray disc. In one embodiment, objects received at the storage unit 600 may be stored within the optical storage 612. For instance, received objects may be written to one or more optical media disks 616 by one or more optical media drives 614.

Further, in one embodiment, hashes received at the storage unit 600 may be stored within the solid state storage 610 of the storage unit 600. In this way, objects and hashes may be stored in different physical locations within the storage unit 600, which may improve a security of both the objects and hashes via data separation.

Figure 7:
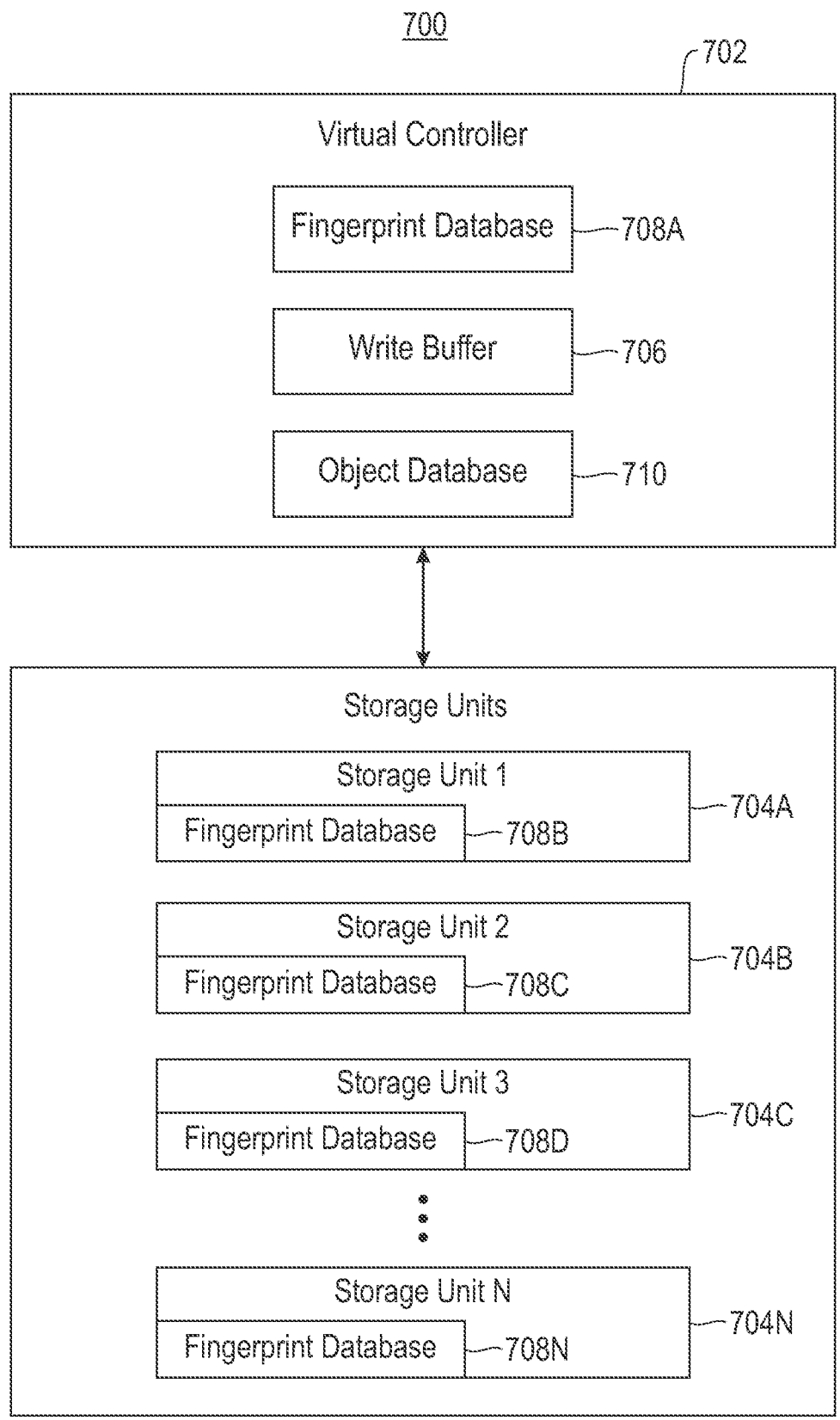
FIG. 7 illustrates an exemplary storage library, in accordance with one embodiment.

FIG. 7 illustrates an exemplary storage library 700, according to one exemplary embodiment. In one embodiment, the storage library 700 may be cloud-based. As shown, the storage library 700 includes a virtual controller 702 and a plurality of storage units 704A-N.

In one embodiment, an object to be stored may be received at the virtual controller 702. For example, the virtual controller 702 may receive the object from one or more applications, devices, etc. In another embodiment, the virtual controller may place the received object in a write buffer 706 of the virtual controller 702. For example, the write buffer 706 may include a plurality of drives in a RAID-6 configuration. In yet another embodiment, the virtual controller 702 may compute a hash value, utilizing the object. For example, the virtual controller may apply an SHA-256 hashing algorithm to the object in order to create a hash value for the object.

Also, in one embodiment, the virtual controller 702 may compare the computed hash value to a plurality of hash values stored in one or more of the fingerprint databases 708A-N. For example, the virtual controller 702 may first compare the computed hash value to fingerprint databases 708B-N, and if a match is not determined, the virtual controller 702 may then compare the computed hash value to the fingerprint database 708A of the virtual controller 702. If a match is determined between the computed hash value and a hash value stored in one or more of fingerprint databases 708A-N, the object may be discarded. If a match is not determined between the computed hash value and any hash value stored in one or more of the fingerprint databases 708A-N, it may be determined that the object is to be sent to one of the plurality of storage units 704A-N. In this way, the virtual controller 702 may perform a deduplication operation, utilizing the fingerprint databases 708A-N.

Additionally, in one embodiment, if the virtual controller determines that the object is to be sent to one of the plurality of storage units 704A-N, the virtual controller 702 may determine one of the plurality of storage units 704A-N to which the object is to be sent. For example, one of the plurality of storage units 704A-N may be selected by the virtual controller 702 based on a location of the object in the write buffer 706. In another embodiment, the virtual controller 702 may send the object to the determined one of the plurality of storage units 704A-N to be stored. An identification of the determined one of the plurality of storage units 704A-N may be stored with the hash value in one or more of the fingerprint databases 708A-N.

Additionally, the virtual controller 702 may determine a name of the object and may store the object name with the hash value in an object database 710 of the virtual controller 702.

Further, in one embodiment, the virtual controller 702 may determine one of the plurality of storage units 704A-N to which the hash value is to be sent, based on the hash value itself. For example, one of the plurality of storage units 704A-N may be selected based on a modulo operation between the most significant byte of the hash value and a total number of the storage units 704A-N within the storage library 700.

Further still, in one embodiment, the virtual controller 702 may send the hash value to the determined one of the plurality of storage units 704A-N, as well as to neighboring storage units within the plurality of storage units 704A-N. For example, if the hash value is determined to be sent to a first storage unit 704B, the hash value may be sent to neighboring storage units 704A and 704C as well. If one or more of the determined one of the plurality of storage units 704A-N and its neighbors are unavailable, the virtual controller 702 may store the hash value in the fingerprint database 708A of the virtual controller 702 until the unavailable storage unit becomes available, at which time the hash value may be removed from the fingerprint database 708A of the virtual controller 702 and sent to the fingerprint database 708B-N of the now-available storage unit.

Also, in one embodiment, the hash value may be sent from the determined one of the plurality of storage units 704A-N (and/or one of the neighboring storage units within the plurality of storage units 704A-N) to the virtual controller 702 (e.g., in response to a failure and/or recovery of the virtual controller 702, a failure and/or recovery of one or more of the fingerprint databases 708A-N, etc.). In another embodiment, after the object has been stored within the storage library 700, a request may be received at the virtual controller 702 for the object. The request may include a name of the object.

In this way, the hash value may be stored in a distributed, load-balanced, scalable and fault tolerant manner within the storage library 700.

In one embodiment, the name of the object included in the request may be identified within the object database 710, and a hash value associated with the name of the object may then be identified within the object database 710. This hash value may be matched to a hash value stored within one or more of the fingerprint databases 708A-N. The matching hash value in the one or more fingerprint databases 708A-N may include metadata indicating an identification of one of the plurality of storage units 704A-N where the object is stored. The virtual controller 702 may send a request for the object to the identified one of the plurality of storage units 704A-N in order to obtain the object, and the virtual controller 702 may return the object to the entity that sent the request for the object.

A Method to Provide a Distributed, Load Balanced, Scalable and Fault Tolerant Heterogenous Fingerprint Storage Service for an Active Archival Object Storage Library using Optical Media for Cloud An active archival object storage library for cloud using optical media consists of a fixed set of units that store objects with erasure coding, thus providing protection against a sector failure, single disc failure or a unit failure in an erasure code group. The objects are deduped prior to storing and only unique objects are stored on the optical media. The fingerprint (SHA-256 hash) of the object being ingested is computed and looked up in the fingerprint database. If there is no hit, then the fingerprint with location info is added to the fingerprint database, the object is stored on the optical media, and the object name and its fingerprint are added to the object database. Otherwise, the object data is discarded, but a new object name with the fingerprint that was looked up is added to the object database.

The object data is protected by erasure coding, but the corresponding fingerprint database is not. This is solved by three-way replication of fingerprints onto heterogenous storage (SSDs on the units) which provides protection against up to two unit/node failures in the erasure code group. Fingerprints are also uniformly distributed among the units, independently of the objects stored on the respective units. This solution is also scalable via capacity, throughput, and latency aspects as all the units in the erasure code group participate in hosting their share of the fingerprint database.

In one embodiment, when a unit is down, the fingerprint copy destined for it is stored temporarily on a RAID-6 protected storage that also hosts the write buffer for object data. These fingerprints are flushed to the unit once it is back in operation.

In one embodiment, the SHA-256 hash or the fingerprint of the object being ingested is computed. The most significant byte of the hash is used to determine the primary destination unit in the erasure code group by taking a modulo operation including a number of units in the erasure code group (i.e., a primary destination unit=most significant byte MOD (# of units in the erasure code group). Visualizing all the units in the erasure code group in a circular arrangement, a predecessor unit (one immediately before the primary destination unit) and a successor unit (one immediately after the primary destination unit) will receive the second and third copy of the fingerprint, respectively. If any of the three units is not operational, a temporary copy of the fingerprint for the unit is stored on the RAID-6 storage that is shared with the write buffer. These copies are flushed to the units when the units are operational again.

The fingerprint database on the unit is stored on the heterogenous storage (SSD) on the unit and the fingerprints stored in the database are independent of the objects stored on the optical media in the unit. The fingerprints are uniformly distributed among the units by virtue of the random nature of fingerprints. This solution is also scalable via capacity, throughput, and latency aspects as all the units in the erasure code group participate in hosting their share of fingerprint database.

The solution provides fault tolerance for up to two unit failures in the erasure code group.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving an object to be stored within a storage library;
computing a hash value, utilizing the object;
determining a first storage location within the storage library to store the hash value, wherein the first storage location is determined based on the hash value; and
conditionally sending the hash value to the first storage location and also conditionally sending the hash value to a plurality of additional storage locations within the storage library that are determined based on the first storage location, including:
comparing the hash value against a plurality of additional hash values stored within the storage library;
in response to determining that the hash value matches one of the additional hash values, adding a name associated with the object to one or more object names associated with the matching additional hash value in response to determining that the name associated with the object does not match one of the one or more object names associated with the matching additional hash value; and
in response to determining that the hash value does not match one of the additional hash values, storing the object within a storage unit of the storage library, creating one or more redundant portions of the object, storing the one or more redundant portions of the object at multiple storage units within the storage library, and storing a name of the object in association with the hash value.

2. The computer-implemented method of claim 1, wherein the storage library is implemented within a cloud computing environment.

3. The computer-implemented method of claim 1, comprising adding the object to a redundant array of independent disks (RAID) buffer within the storage library.

4. The computer-implemented method of claim 1, comprising adding the object to a write buffer within a virtual controller of the storage library.

5. The computer-implemented method of claim 1, wherein computing the hash value includes applying one or more cryptographic hash functions to the object, the one or more cryptographic hash functions including an SHA-256 hash function.

6. The computer-implemented method of claim 1, wherein the first storage location within the storage library determined to store the hash value is different from another storage location within the storage library determined to store the object.

7. The computer-implemented method of claim 1, wherein in response to determining that the first storage location is currently unavailable, the hash value is temporarily stored in a fingerprint database on a virtual controller until first storage location becomes available.

8. The computer-implemented method of claim 1, comprising discarding the object in response to determining that the hash value matches one of the additional hash values.

9. A computer program product comprising one or more computer readable storage media, and program instructions collectively stored on the one or more computer readable storage media, the program instructions comprising instructions configured to cause one or more processors to perform a method comprising:
   receiving, by the one or more processors, an object to be stored within a storage library;
   computing, by the one or more processors, a hash value, utilizing the object;
   determining, by the one or more processors, a first storage location within the storage library to store the hash value, wherein the first storage location is determined based on the hash value; and
   conditionally sending, by the one or more processors, the hash value to the first storage location and also conditionally sending, by the one or more processors, the hash value to a plurality of additional storage locations within the storage library that are determined based on the first storage location, including:
      comparing the hash value against a plurality of additional hash values stored within the storage library;
      in response to determining that the hash value matches one of the additional hash values, adding a name associated with the object to one or more object names associated with the matching additional hash value in response to determining that the name associated with the object does not match one of the one or more object names associated with the matching additional hash value; and
      in response to determining that the hash value does not match one of the additional hash values, storing the object within a storage unit of the storage library, creating one or more redundant portions of the object, storing the one or more redundant portions of the object at multiple storage units within the storage library, and storing a name of the object in association with the hash value.

10. The computer program product of claim 9, wherein the storage library is implemented within a cloud computing environment.

11. The computer program product of claim 9, wherein the storage library includes a plurality of storage units, wherein each of the plurality of storage units includes optical storage.

12. The computer program product of claim 9, comprising adding, by the one or more processors, the object to a write buffer within a virtual controller of the storage library.

13. The computer program product of claim 9, wherein computing the hash value includes applying one or more cryptographic hash functions to the object, the one or more cryptographic hash functions including an SHA-256 hash function.

14. A computer-implemented method, comprising:
   receiving an object to be stored within a storage library;
   computing a hash value, utilizing the object;
   determining a first storage location within the storage library to store the hash value, wherein the first storage location is determined based on the hash value; and
   conditionally sending the hash value to the first storage location and also conditionally sending the hash value to a plurality of additional storage locations within the storage library that are determined based on the first storage location, including:
      comparing the hash value against a plurality of additional hash values stored within the storage library;
      in response to determining that the hash value matches one of the additional hash values:
         discarding the object,
         adding a name associated with the discarded object to one or more object names associated with the matching additional hash value in response to determining that the name associated with the discarded object does not match one of the one or more object names associated with the matching additional hash value, and
         discarding the name associated with the discarded object in response to determining that the name associated with the discarded object does match one of the one or more object names associated with the matching additional hash value; and
      in response to determining that the hash value does not match one of the additional hash values:
         storing the object within a storage unit of the storage library, utilizing erasure coding, including creating one or more redundant portions of the object, and storing the one or more redundant portions of the object at multiple storage units within the storage library, and
         storing a name of the object in association with the hash value.

* * * * *